US010037683B1

(12) United States Patent
Hosey et al.

(10) Patent No.: US 10,037,683 B1
(45) Date of Patent: Jul. 31, 2018

(54) CRASH DETECTION USING GNSS VELOCITY MEASUREMENTS AND BUS MONITORING

(71) Applicant: GM GLOBAL TECHNOLOGY OPERATIONS LLC, Detroit, MI (US)

(72) Inventors: Eric T. Hosey, Royal Oak, MI (US); Andrew J. MacDonald, Grosse Pointe Park, MI (US); Curtis L. Hay, West Bloomfield, MI (US); Steven R. Croyle, Bingham Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/469,482

(22) Filed: Mar. 24, 2017

(51) Int. Cl.
| | | |
|---|---|---|
| *B60Q 1/00* | (2006.01) | |
| *B60Q 1/22* | (2006.01) | |
| *B60Q 1/26* | (2006.01) | |
| *G08B 25/10* | (2006.01) | |
| *H04L 12/40* | (2006.01) | |
| *H04L 12/26* | (2006.01) | |
| *B60R 21/00* | (2006.01) | |

(Continued)

(52) U.S. Cl.
CPC .............. *G08B 25/10* (2013.01); *B60R 21/00* (2013.01); *G01S 19/17* (2013.01); *G01S 19/52* (2013.01); *H04L 12/40* (2013.01); *H04L 43/0847* (2013.01); *B60R 2021/0027* (2013.01); *H04L 2012/40273* (2013.01)

(58) Field of Classification Search
CPC .............. H04L 67/12; H04M 1/72538; H04M 1/72536; H04M 2250/12; H04M 2250/10; H04W 4/22; H04W 4/027; H04W 4/046; H04W 76/007; G07C 5/008; G07C 5/0808; G07C 5/0816; G05D 1/0088; G05D 1/0055; G05D 1/0278; G08G 1/16; G08G 1/166; G08G 1/162; G08G 1/161; G08G 1/163; G08G 1/164; G08G 1/205; B60W 2030/082; B60W 30/00; B60W 50/029; B60W 50/0205; B60W 50/021; B60W 50/022; B60R 2021/0027
See application file for complete search history.

(56) References Cited

U.S. PATENT DOCUMENTS

| | | | | |
|---|---|---|---|---|
| 9,432,828 | B1 * | 8/2016 | Tu ........................... | H04W 4/22 |
| 9,628,975 | B1 * | 4/2017 | Watkins .................. | H04W 4/22 |
| 9,646,428 | B1 * | 5/2017 | Konrardy ................ | G07C 5/08 |

(Continued)

*Primary Examiner* — Jonathan R Beckley
(74) *Attorney, Agent, or Firm* — David Willoughby; Reising Ethington P.C.

(57) ABSTRACT

A vehicle telematics device for a vehicle that includes an electronic processor, a wireless chipset for wireless communication to and from the vehicle, and a bus interface for receiving bus messages from a communications bus in the vehicle. The vehicle telematics device includes computer readable memory storing program code that, upon execution by the processor, causes the vehicle telematics device to: (a) monitor for messages received by the bus interface from the communications bus; (b) detect a communication failure of the communication bus based on the monitoring; (c) determine a vehicle movement that is indicative of a vehicle crash; and (d) initiate a communication with a remote facility in response to both the detection of the communication failure and the determination of the vehicle movement that is indicative of a crash a notification.

12 Claims, 2 Drawing Sheets

(51) Int. Cl.
*G01S 19/17* (2010.01)
*G01S 19/52* (2010.01)

(56) References Cited

U.S. PATENT DOCUMENTS

| | | | | |
|---|---|---|---|---|
| 2012/0253821 | A1* | 10/2012 | Kamiya | G10L 99/00 704/270.1 |
| 2014/0253308 | A1* | 9/2014 | Kanda | G08G 1/205 340/436 |
| 2017/0164158 | A1* | 6/2017 | Watkins | H04W 4/027 |

* cited by examiner

CRASH DETECTION USING GNSS VELOCITY MEASUREMENTS AND BUS MONITORING

INTRODUCTION

This disclosure relates to methods and systems for secondary detection of a vehicle crash that may be used in addition to or in lieu of direct crash sensor systems on the vehicle.

Most passenger vehicles designed for use on public roadways include crash sensing systems that are used for deployment of crash mitigation safety devices such as air bags and for remote reporting of such events; for example, to provide emergency services and prompt notification to first responders when necessary. Those systems that are used for remote reporting of crashes typically rely on both an onboard crash sensing module for detection of the collision and on an onboard wireless communications module to receive crash notifications from the sensing module and communicate them to a remote data and/or call center.

Depending on the nature and severity of the crash, some of the vehicle electronics may become damaged and non-operational. For example, intra-vehicle communications over an onboard bus may be interrupted and disabled due to the damage of a crash, thereby preventing any notification of the crash from the sensing module to the wireless communications module, and thus preventing notification of the crash from the vehicle generally to the remote data or call center.

SUMMARY

According to a first embodiment, there is provided a method of detecting a vehicle crash at a vehicle using vehicle electronics installed in the vehicle, the vehicle electronics including a wireless communications device, a vehicle system module, and a communications bus communicatively coupling the wireless communications device with the vehicle system module such that bus messages may be sent from the vehicle system module and received by the wireless communications device over the communications bus. The method includes the steps of: (a) monitoring, at the wireless communications device, the communication bus for messages sent over the communications bus from the vehicle systems module; (b) detecting, at the wireless communications device, a communication failure of the communication bus based on the monitoring in step (a); (c) determining, at the wireless communications device, a vehicle movement that is indicative of a vehicle crash; and (d) initiating, from the wireless communications device, a communications connection with a remote facility in response to both the detection of the communication failure and the determination of the vehicle movement that is indicative of a vehicle crash.

According to another embodiment, there is provided a vehicle telematics device, comprising an electronic processor, a wireless chipset for wireless communication to and from the vehicle, and a bus interface for receiving bus messages from a communications bus in the vehicle, the vehicle telematics device further comprising non-transitory computer readable memory storing program code that, upon execution by the processor, causes the vehicle telematics device to: (a) monitor for messages received by the bus interface from the communications bus; (b) detect a communication failure of the communication bus based on the monitoring; (c) determine a vehicle movement that is indicative of a vehicle crash; and (d) initiate a communication with a remote facility in response to both the detection of the communication failure and the determination of the vehicle movement that is indicative of a crash a notification.

BRIEF DESCRIPTION OF THE DRAWINGS

Exemplary embodiments of the invention will hereinafter be described in conjunction with the appended drawings, wherein like designations denote like elements, and wherein.

DETAILED DESCRIPTION

The system and methods described below enable a vehicle to automatically detect an (inferred) vehicle crash as a secondary detection technique in the event a primary, sensor-based crash sensing module fails to detect or report the vehicle crash. The method carried out by the disclosed system generally involves monitoring a vehicle communications bus for messages indicating proper operation of the communication bus or of a vehicle system module (VSM) operating on the bus, detecting a loss of the bus messages which indicates a communication failure on the bus, determining that the vehicle has undergone an acceleration indicative of a vehicle crash and, based on both the detection of the communication failure on the bus and the acceleration indicative of a crash, placing a call or otherwise initiating a communication to a remote facility, such as a call center or public safety answering point (PSAP), to report the vehicle crash.

Figure 1:
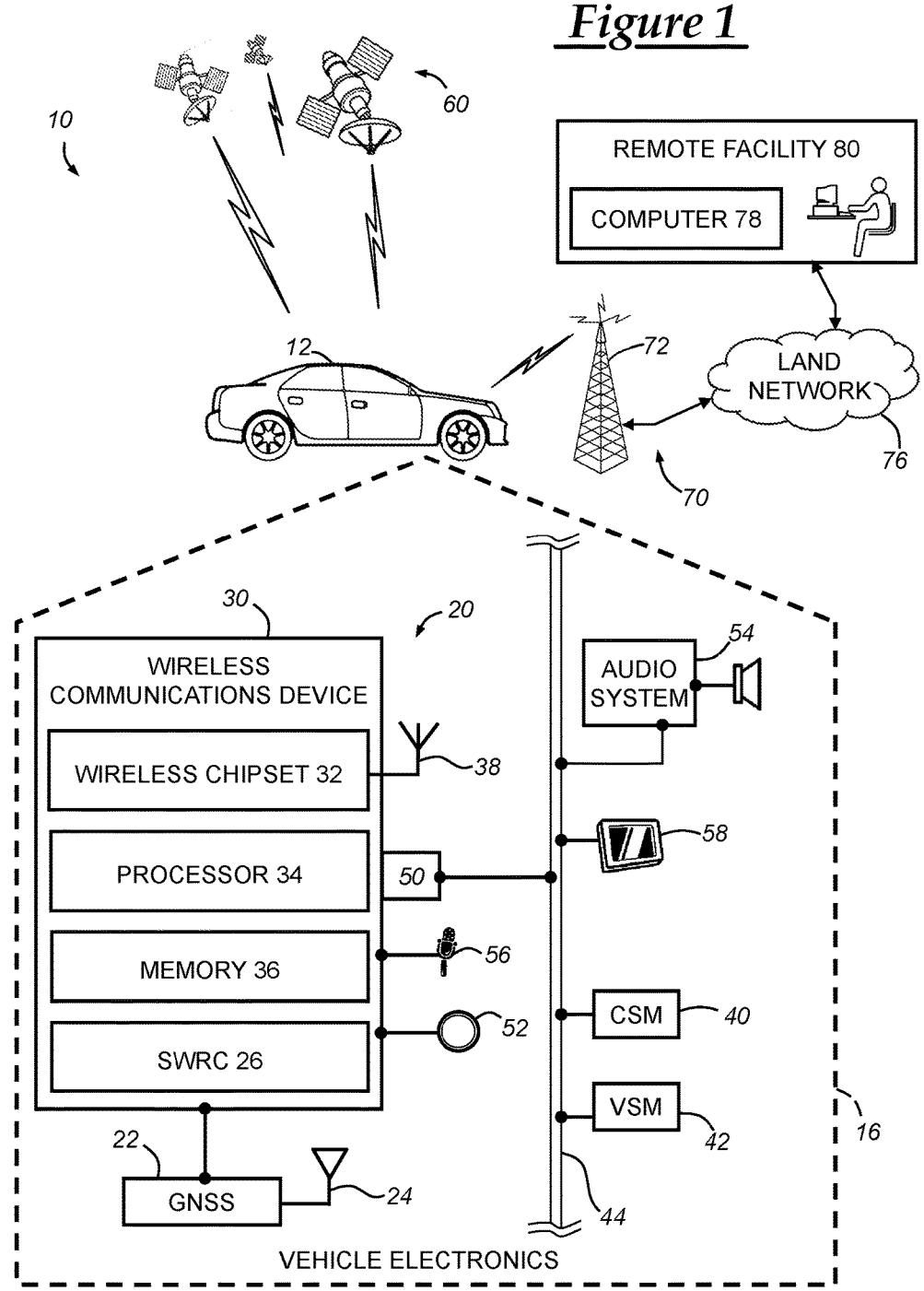
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12, a constellation of GNSS satellites 60, one or more wireless carrier systems 70, a land communications network 76, and a remote facility 80 that includes one or more computers 78 and that may include an advisor for handling voice calls from vehicle 12. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/ GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 and/or to computer 78. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber-optic or other optical network, a cable network, power lines, other wireless networks such as wireless local area networks (WLANs), or networks providing broadband wireless access (BWA), or any combination thereof.

Remote facility 80 may be any of a number of call and/or data centers, such as a telematics service provider capable of handling data communications with vehicle 12 as well as voice calls with an operator or other occupant of the vehicle. Alternatively, remote facility 80 may be a PSAP. Calls or other communications from vehicle 12 as a result of a crash detection may be made to the telematics service provider or PSAP to report the event and obtain emergency and other first responder services if needed.

Remote facility 80 may be designed to provide the vehicle 12 with other back-end functions. The remote facility 80 may include one or more switches, servers, databases, advisors (live or automatons), as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Computers 78 (only one shown) can be some of a number of computers accessible via a private or public network such as the Internet. Each such computer 78 can be used for one or more purposes, such as for data communication with vehicle 12 to access information from the vehicle as well as database information about the vehicle or owner or lessee. Such information may be useful in responding to a crash notification from the vehicle, such as to provide location information originating from the vehicle to first responders. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; a network time protocol (NTP) or a precision time protocol (PTP) server or system; or a third party repository to or from which vehicle data or other information is provided, whether by communicating with the vehicle 12, remote facility 80, or both. A computer 78 can also be used for providing Internet connectivity such as domain name system (DNS) services or as a network address server that uses dynamic host configuration protocol (DHCP) or other suitable protocol to assign an interne protocol (IP) address to the vehicle 12.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 12 includes vehicle electronics 16, some of which are shown in FIG. 1. The vehicle electronics 16 are installed in vehicle 12 and used to carry out the various electrical portions of vehicle operation, including operating the powertrain, steering, climate control, signaling, lighting, communications, etc. Vehicle electronics 16 includes various vehicle system modules (VSMs), including a vehicle telematics device 20 and crash sensing module (CSM) 40, all connected to a communications bus 44 that provides the VSMs with network connections using one or more network protocols. For sending and receiving messages over bus 44, telematics device 20 includes a bus interface 50 through which commands and data are sent and received. This bus interface 50 may be implemented using known devices and circuits to communicate over the bus using the protocols of the particular type of intra-vehicle network used. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. The vehicle electronics 16 includes other VSMs represented by VSM 42, and may include other VSMs not connected to bus 44.

Each of the VSMs are installed in the vehicle as an integral part thereof. The installed VSMs are physically integrated into the vehicle as OEM-installed components, although some may be installed as aftermarket components. The installed VSMs have power and/or data connections with other portions of the vehicle electronics that are either hardwired or provided wirelessly. Examples of the VSMs include the telematics device 20 and CSM 40, each of which may include an electronic processor and non-transitory computer readable memory storing program code to carry out the various functions of that module. The vehicle 12 can also include other VSMs 42 in the form of electronic hardware components that are located throughout the vehicle and which may receive input from one or more sensors and use the sensed input to perform diagnostic, monitoring, control, reporting, and/or other functions. For example, other VSMs may include a body control module (BCM), a center stack module, an infotainment unit, a powertrain control module, or a transmission control unit. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the abovementioned VSMs are only examples of some of the modules that may be used in vehicle 12, as numerous others are also possible.

CSM 40 monitors for vehicle collisions and may perform other diagnostic functions. As with other VSMs on the bus 44, CSM 40 may include a bus interface for sending and receiving messages using the proper bus protocols for the vehicle network being used. It may be implemented using an electronic processor and memory storing program code for carrying out its functions. Those components may be as described below in conjunction with communications device 30. CSM 40 also includes one or more crash sensors for detecting vehicle collisions. During normal operations, CSM 40 monitors for sensor input and sends a crash notification message over the bus to the communications device 30 when a collision is detected. Also during normal operation, CSM 40 provides periodic CSM messages over the communications bus, at fixed or varied intervals. The presence of these periodic CSM messages indicates that the crash sensing module is operating such that the crash sensing module is capable of providing crash notifications over the communication bus 44. In the event of a crash severe enough to disable the CSM 40 or bus 44, there will be an interruption or other loss of these periodic messages which can be detected by the communications device 30 and used as an indication of a communication failure on the bus.

The vehicle telematics device 20 may be specifically configured to carry out some or all of the methods disclosed herein. It may be implemented as a standalone module or, in other embodiments, it may be incorporated or included as a part of one or more other VSM, such as a center stack module, body control module, an infotainment module, a head unit, and/or a gateway module.

The vehicle telematics device 20 includes a GNSS receiver 22 with its antenna 24, as well as a wireless communications device 30 that can be implemented as an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The wireless communications device 30 preferably uses radio transmissions to establish a communications channel (a voice channel and/or a data channel) with wireless carrier system 70 so that voice and/or data transmissions can be sent and received over the channel. By providing both voice and data communication, wireless communications device 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

GNSS receiver 22 may be connected directly to wireless communications device 30 such that it outputs its data directly to the communications device 30 without that data having to pass over the communications bus. This permits the communications device 30 to receive the GNSS data (location, speed, etc.) even if there is a bus failure. In other embodiments, the GNSS receiver 22 may also be connected to the vehicle bus 44, in which case it may have its own bus interface. In yet other embodiments, it may not be connected directly to communications device 30 such that all data received by the communications device 30 from the GNSS receiver 22 goes over the bus and through the bus interface 50.

According to one embodiment, wireless communications device 30 utilizes cellular communication according to either GSM, CDMA, or LTE standards and thus includes a standard cellular chipset 32 for voice communications like hands-free calling, a wireless modem for data transmission, an electronic processing device 34, one or more digital memory devices 36, and a dual antenna 38. It should be appreciated that the modem can either be implemented through software that is stored in the telematics unit and is executed by processor 34, or it can be a separate hardware component located internal or external to wireless communications device 30. The modem can operate using any number of different standards or protocols such as LTE, EVDO, CDMA, GPRS, and EDGE, and allows for packet-switched data communication. Wireless networking between the vehicle and other networked devices can also be carried out using wireless communications device 30. For this purpose, wireless communications device 30 may include a short range wireless communication (SRWC) module 26 that is configured to communicate wirelessly according to one or more wireless protocols, including SRWC such as any of the IEEE 802.11 protocols, WiMAX, ZigBee™, Wi-Fi direct, Bluetooth™, Bluetooth Low Energy™ (BLE), or near field communication (NFC). When used for packet-switched data communication such as TCP/IP, the SRWC module 26 can be configured with a static IP address or can be set up to automatically receive an assigned IP address from another device on the network such as a router or from a network address server. This SRWC capability may be used in conjunction with or in lieu of the cellular communication via carrier system 70 so that crash notifications may be communicated even if there is a loss of ability to communicate via the carrier system 70.

Processor 34 can be any type of electronic device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as program code in the form of software or firmware programs stored in memory 36, which enable the device 30 to provide a wide variety of services. For instance, processor 34 can execute programs or process data to carry out at least a part of the method discussed herein. Memory 36 may include RAM, other temporary powered memory, any non-transitory computer-readable medium (e.g., NVRAM or EEPROM), or any other electronic computer medium that stores some or all of the software needed to carry out the various external device functions discussed herein.

GNSS receiver 22 is a vehicle system module that receives radio signals from a constellation of satellites 60 such as those used in the GPS, GLONASS, and the EU's Galileo systems currently in use. From these signals, the receiver 22 can determine vehicle position and speed, and this may be provided to wireless communications device 30 for use in connection with methods described herein to determine vehicle movements indicative of a vehicle crash. By examining changes in vehicle speed, the wireless communications device 30 may determine accelerations of the vehicle that are indicative of a collision, such as short-lived large positive or negative accelerations in excess of that capable of being produced by the vehicle's propulsion system.

The location and/or vehicle speed data received from GNSS receiver 22 can be used for various other vehicle services, such as to identify known locations like a vehicle operator's home or workplace. Navigation information can be presented on a display 58 (or other display within the vehicle) or can be presented verbally such as is done when supplying turn-by-turn navigation. The navigation services can be provided using a dedicated in-vehicle navigation module (which can be part of GNSS receiver 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS receiver 22 from the remote facility 80 via a wireless communication device 30.

Vehicle electronics 16 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
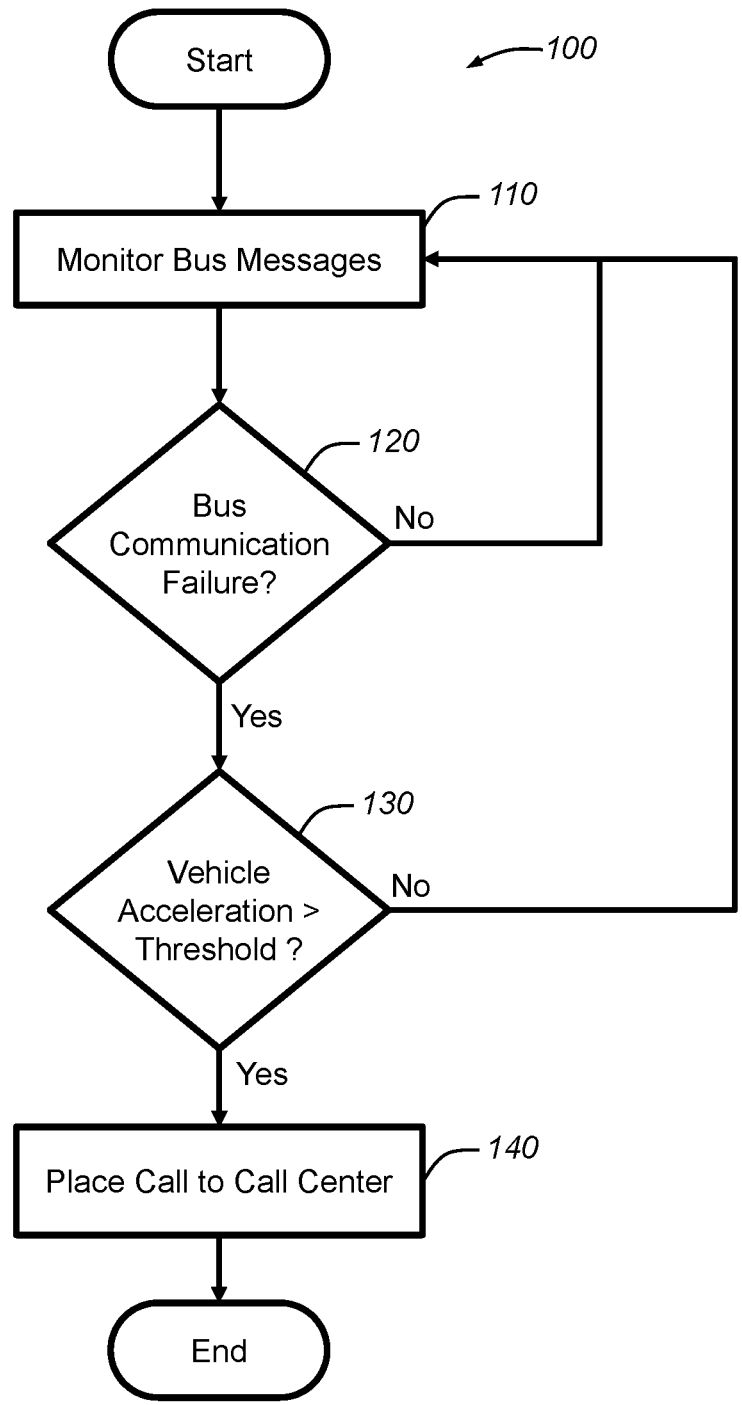
FIG. 2 is a flowchart illustrating a method of detecting a vehicle crash using the system of FIG. 1.

With reference to FIG. 2, there is shown an embodiment of a method 100 of detecting a vehicle crash at a vehicle such as vehicle 12. The method may be implemented using the vehicle telematics device 20 with its wireless communications device 30 and GNSS receiver 22. The method begins at block 110 where, during normal vehicle operations, the communications device 30 monitors the communication bus for messages sent over the communications bus from one of the vehicle systems modules (VSMs), such as CSM 40. As noted above, periodic messages sent from CSM 40 indicate that CSM 40 is operating and capable of sending crash notification messages in the event that a crash is detected by one of its sensors. And periodic receipt of those CSM messages by communications device 30 indicate that the bus 44 is functional and operating.

At step 120, a check is made to determine if the CSM messages are periodically being received by communications device 30 over the bus 44. If so, the process loops back to step 110, and this process continues as long as messages are being received. Any suitable fixed or variable interval may be use; for example, every 100 ms or some other rate that may be selected depending on the particular application and on bus utilization by other VSMs. If, at step 120, communications device 30 detects that the periodic messages have stopped, this may be considered to be a communication failure that might be caused by any of a number of factors, one of which is the possibility that the vehicle was involved in a collision of sufficient force or damage to disable CSM 40 or the bus 44. If so, flow moves to step 130.

At step 130, a check is made for vehicle movement that might be indicative of a crash. Various means may be used for this determination. For example, vehicle speed data from GNSS receiver 22 may be monitored by the communications device 30, and this data can be converted to an acceleration, either by derivation of the continuous speed data received from the GNSS receiver 22 or by subtracting successive values and dividing by the time lapse between those values. By obtaining a vehicle acceleration measurement, a determination may be made whether that acceleration is of a sufficient magnitude and direction to indicate a vehicle crash. That determination may be carried out by comparing the vehicle acceleration to an acceleration threshold indicative of a vehicle crash. The acceleration threshold may be a single value determined empirically from test data, or from simulations, or determined in any other suitable manner. In other embodiments, the threshold may be dependent on such things as direction of the acceleration such that, for example, a first, smaller threshold acceleration in a lateral direction of the vehicle (perpendicular to its typical direction of travel along its fore and aft axis) may be used to determine that a vehicle crash has occurred, whereas a second, higher threshold acceleration in the fore and aft direction of propulsion may be used to distinguish accelerations due to a collision from ones due to the vehicle's propulsion system. Alternatively, a more complex acceleration profile may be developed and used, as will be apparent to those skilled in the art. Other techniques for determining a vehicle movement that is indicative of a vehicle crash may be used; for example, using data from an accelerometer in the vehicle telematics device 20 or accessible by that device.

If there is no determination of acceleration or other vehicle movement by the communications device 30 based on the GNSS vehicle speed data or otherwise, then the process again returns to step 110 to again monitor for periodic messages from CSM 40 or whatever other VSM 42 is being used as an indication of proper bus 44 operation. However, if a significant enough vehicle movement is detected at step 130, then the process moves to block 140 where the communications device 30 initiates a communications connection with remote facility 80. This communications connection may be by way of a cellular data and/or voice call to facility 80 to connect the vehicle with computer 78 or the vehicle operator with an advisor or PSAP dispatcher. If desired or needed, this communications connection may also or instead be by way of WiFi or other short range wireless communication using SRWC module 26. Apart from placing a voice call to an advisor at a telematics service provider (e.g., at remote facility 80), the wireless communications device 30 may also or instead be configured to generate a collision notification and send the collision notification to computer 78 whether via the wireless carrier system 70 or via another packet-data switched route using, for example, SRWC module 26.

As will be appreciated, this communications connection initiated by the vehicle is done in response to both the detection of a bus communication failure and the determination of a vehicle movement that is indicative of a vehicle crash. And although those two detected events in steps 120 and 130 may individually not be sufficient to infer a vehicle crash and place a call or notification to the remote facility, together they provide a reasonably reliable method of detecting a crash.

For embodiments such as that shown in FIG. 1 where GNSS receiver 22 is integrated in with communications device 30, the vehicle speed data from GNSS receiver 22 may be provided directly to communications device 30 and its processor 34 via a communications path other than the communications bus 44. The vehicle speed data received by processor 34 from the GNSS receiver 22 does not pass over the bus 44 or through the bus interface 50. Thus, any failure of bus operation will not prevent receipt and processing of the vehicle speed data, nor prevent the initiation of a communication from the vehicle to remote facility 80.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although FIG. 2 is depicted as carrying out step 130 (determining whether a vehicle movement has occurred indicating a crash) only after and only if step 120 detects a communication failure on the bus, it will be appreciated that these steps could be reversed, such that a vehicle acceleration or other movement indicative of a crash is first determined and only then are bus messages checked to see if communication from CSM 40 is occurring. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

What is claimed is:

1. A method of reporting a vehicle crash at a vehicle using vehicle electronics installed in the vehicle, the vehicle electronics including a wireless communications device, a vehicle system module, a global navigation satellite system (GNSS) receiver, and a communications bus communicatively coupling the wireless communications device with the vehicle system module such that bus messages may be sent from the vehicle system module and received by the wireless communications device over the communications bus, the method comprising the steps of:

(a) monitoring, at the wireless communications device, the communication bus for messages sent over the communications bus from the vehicle systems module, wherein the vehicle system module comprises a crash sensing module (CSM) that is used as a primary, sensor-based module for detecting a vehicle crash at the vehicle;

(b) detecting, using the wireless communications device, a communication failure of the communication bus based on the monitoring in step (a) such that the primary, sensor-based module for detecting a vehicle crash at the vehicle is not operational;

(c) after detecting the communication failure of the communications bus such that the primary, sensor-based module for detecting a vehicle crash at the vehicle is not operational, determining, at the wireless communications device, a vehicle movement that is indicative of a vehicle crash, wherein the vehicle movement that is indicative of a vehicle crash is determined through use of vehicle speed data that is received from the GNSS receiver, wherein the vehicle speed data is received from the GNSS receiver by the wireless communications device over a communication path other than the communications bus; and (d) initiating, from the wireless communications device, a communications connection with a remote facility in response to both the detection of the communication failure and the determination of the vehicle movement that is indicative of a vehicle crash.

2. The method set forth in claim 1, wherein the crash sensing module provides periodic CSM messages over the communications bus, wherein the CSM messages indicate that the crash sensing module is operating such that the crash sensing module is capable of providing crash notifications over the communication bus, and wherein step (a) further comprises monitoring the communications bus for periodic receipt of the CSM messages, and wherein step (b) further comprises determining the communication failure by detecting an interruption in the periodic receipt of CSM messages on the communications bus.

3. The method set forth in claim 1, wherein step (c) further comprises carrying out the following steps using the wireless communications device:

(c1) receiving the vehicle speed data from the GNSS receiver;

(c2) determining vehicle acceleration using the speed data;

(c3) comparing the vehicle acceleration to an acceleration threshold indicative of a vehicle crash; and (c4) determining that the vehicle has undergone the vehicle movement that is indicative of a vehicle crash when the vehicle acceleration is greater than the acceleration threshold.

4. The method set forth in claim 3, wherein step (c1) further comprises sending the vehicle speed data from the GNSS receiver to the wireless communications device over the communication path.

5. The method set forth in claim 1, wherein step (d) further comprises placing a voice communications call from the wireless communications device to an advisor at a call center.

6. The method set forth in claim 1, wherein step (d) further comprises:

(d1) generating, at the wireless communications device, a collision notification in response to both the detection of the communication failure and the determination of the vehicle movement that is indicative of a crash;

(d2) sending the collision notification wirelessly from the vehicle using the wireless communications device.

7. The method set forth in claim 1, wherein step (c) is carried out in response to the detection of the communication failure in step (b).

8. The method set forth in claim 1, wherein step (b) is carried out in response to the determination of the vehicle movement in step (c).

9. A vehicle telematics device for a vehicle, comprising;

an electronic processor, a wireless chipset for wireless communication to and from the vehicle, and a bus interface for receiving bus messages from a communications bus in the vehicle, a non-transitory computer readable memory storing program code that, upon execution by the electronic processor, causes the vehicle telematics device to:

(a) monitor for messages received by the bus interface from the communications bus;

(b) detect a communication failure of the communication bus based on the monitoring, wherein the communication failure of the communication bus indicates that a connection to a primary, sensor-based crash sensing module is broken;

(c) after the communication failure is detected, determine a vehicle movement that is indicative of a vehicle crash using a secondary crash detection technique that includes using vehicle movement or speed data from a global navigation satellite system (GNSS) receiver included in the vehicle, the vehicle movement or speed data received from the GNSS receiver by the electronic processor without going through the bus interface; and (d) initiate a communication with a remote facility in response to both the detection of the communication failure and the determination of the vehicle movement that is indicative of a crash.

10. The vehicle telematics device set forth in claim 9, further comprising the GNSS receiver, the GNSS receiver receiving GNSS signals from GNSS satellites.

11. The vehicle telematics device set forth in claim 10, wherein the vehicle telematics device is operable under control of the program code when executed by the electronic processor to:

determine vehicle acceleration using the speed data;

compare the vehicle acceleration to an acceleration threshold indicative of a vehicle crash; and determine that the vehicle has undergone the vehicle movement that is indicative of a vehicle crash when the vehicle acceleration is greater than the acceleration threshold.

12. A method of reporting a vehicle crash at a vehicle using vehicle electronics installed in the vehicle, wherein the vehicle electronics include a wireless communications device, a crash sensing module, a global navigation satellite system (GNSS) receiver, and a communications bus communicatively coupling the wireless communications device with the crash sensing module such that bus messages may be sent from the crash sensing module and received by the wireless communications device over the communications bus, wherein the GNSS receiver is communicatively coupled to the wireless communications device using a communication path other than the communications bus, and wherein the vehicle electronics are configured to employ a primary crash sensing technique that uses the crash sensing module to detect and report a vehicle crash to the wireless communications device via the communications bus, the method comprising the steps of:

(a) using the wireless communication device, detecting a communication failure over the communications bus between the wireless communications device and the crash sensing module such that the primary crash sensing technique fails to detect or report a vehicle crash;

(b) after detecting the communication failure over the communications bus between the wireless communications device and the crash sensing module, determining whether the vehicle has been involved in a vehicle crash using a secondary crash sensing technique, wherein the secondary crash sensing technique uses vehicle speed information from the GNSS receiver, wherein the vehicle speed information is received from the GNSS receiver by the wireless communications device over a communication path other than the communications bus; and (c) when it is determined that the vehicle has been involved in a vehicle crash using the secondary crash sensing technique, reporting the vehicle crash to a remote facility.

\* \* \* \* \*